United States Patent
Zhou

(10) Patent No.: US 9,885,819 B2
(45) Date of Patent: Feb. 6, 2018

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 317 days.

(21) Appl. No.: 14/430,984

(22) PCT Filed: Jan. 16, 2015

(86) PCT No.: PCT/CN2015/070872
§ 371 (c)(1),
(2) Date: Mar. 25, 2015

(87) PCT Pub. No.: WO2016/101369
PCT Pub. Date: Jun. 30, 2016

(65) Prior Publication Data
US 2016/0195665 A1    Jul. 7, 2016

(30) Foreign Application Priority Data
Dec. 24, 2014    (CN) .......................... 2014 1 0819605

(51) Int. Cl.
*G02F 1/1335*    (2006.01)
*F21V 8/00*    (2006.01)

(52) U.S. Cl.
CPC ............ *G02B 6/003* (2013.01); *G02B 6/0021* (2013.01); *G02B 6/0088* (2013.01)

(58) Field of Classification Search
CPC . G02F 1/133615; G02B 6/0068; G02B 6/003; G02B 6/0021; G02B 6/0088
USPC .......................................................... 349/65
See application file for complete search history.

(56) References Cited

U.S. PATENT DOCUMENTS

| | | | |
|---|---|---|---|
| 2011/0210368 A1* | 9/2011 | Jeong ............... | B29D 11/00009 257/98 |
| 2012/0113351 A1* | 5/2012 | Cheng ............... | G02F 1/133308 349/58 |
| 2012/0268656 A1* | 10/2012 | Takano ................ | G02B 6/0025 348/725 |

(Continued)

*Primary Examiner* — Nathanael R Briggs
*Assistant Examiner* — William Peterson
(74) *Attorney, Agent, or Firm* — Andrew C. Cheng

(57) ABSTRACT

Disclosed are a backlight module and a display device. The display device includes a liquid crystal panel. The backlight module includes a backplane, a light guide plate, a light source, and an optic film. The light guide plate, the light source, and the optic film are arranged on the backplane. The optic film is stacked on the light guide plate. The light guide plate includes a light incidence side. The light source includes a light emission surface and a lighting-opposite surface opposite to the light emission surface. The light emission surface of the light source is arranged to face the light incidence side of the light guide plate. The light emission surface includes a plurality of light transmission structures projecting therefrom. The liquid crystal panel is disposed on the backlight module. The liquid crystal panel and the backlight module are fixed together by a double-sided adhesive tape.

16 Claims, 1 Drawing Sheet

(56) References Cited

U.S. PATENT DOCUMENTS

2014/0029295 A1* 1/2014 Hsiao .................. G02B 6/0011
362/606

* cited by examiner

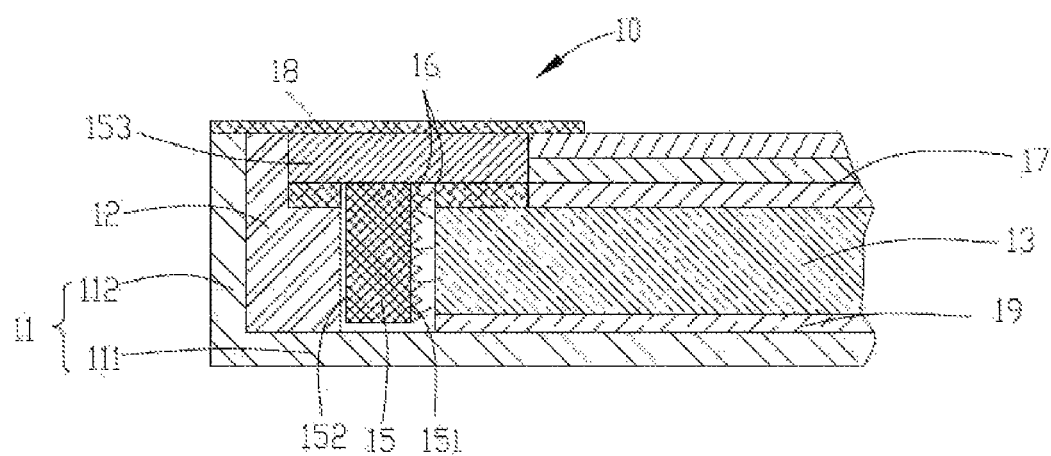

BACKLIGHT MODULE AND DISPLAY DEVICE

CROSS REFERENCE TO RELATED APPLICATIONS

This application claims the priority of Chinese Patent Application No. 201410819605.3, entitled "Backlight Module and Display Device", filed on Dec. 24, 2014, the disclosure of which is incorporated herein by reference in its entirety.

BACKGROUND OF THE INVENTION

1. Field of the Invention

The present invention relates to the field of liquid crystal displaying technology, and in particular to a backlight module and a display device.

2. The Related Arts

Currently, liquid crystal display devices have been widely used in various electronic products to serve as display components of electronic devices. Following the trend that electronic products get light and thin, bezels of electronic devices have been made increasingly slim. The requirement for brightness is getting severe and the need for saving power must also be satisfied. A backlight module is an important component of the liquid crystal display device and light incidence efficiency of a light bar of the backlight module must suit the need of being increasingly high, as well as the increasingly raised optic tastes.

A conventional backlight module includes a backplane, a mold frame, and a light guide plate surrounded by the mold frame. A light-bar light source is arranged between the light guide plate and a light incidence side of the light guide plate. An optic film is fixed by a light-shielding double-sided adhesive tape to the mold frame. However, in practical applications, the light emitting from the light source is generally diverging so that a portion of the light does not enter the light guide plate, making the light incidence efficiency low and thus affecting the performance of the backlight module.

SUMMARY OF THE INVENTION

The technical solution to be addressed in the present invention is to provide a backlight module, which overcomes the issue of low light incidence efficiency of the light of the backlight module entering a light guide plate.

The present invention also provides a display device.

To achieve the above object, embodiments of the present invention provide the following technical solutions:

The present invention provides a backlight module, which comprises a backplane, a light guide plate, a light source, and an optic film, the light guide plate, the light source, and the optic film being arranged on the backplane, the optic film being stacked on the light guide plate, the light guide plate comprising a light incidence side, the light source comprising a light emission surface and a lighting-opposite surface opposite to the light emission surface, the light emission surface of the light source being arranged to face the light incidence side of the light guide plate, the light emission surface comprising a plurality of light transmission structures projecting therefrom.

In the above backlight module, the light transmission structures comprise prismatic or triangular lenses.

In the above backlight module, the light guide plate has a surface that comprises a light homogenization structure, which makes light emitting from the light guide plate homogeneous, and another surface that is opposite to said surface and is coated with a reflective coating layer.

In the above backlight module, the backlight module further comprises a mold frame, the mold frame surrounding the light guide plate and the optic film and being disposed on the backplane, the light source being located between the mold frame and the light incidence side.

In the above backlight module, the light source further comprises the light source circuit board, the light source circuit board being fixed by a double-sided adhesive tape to an inside surface of the mold frame and the light guide plate.

In the above backlight module, the backplane comprises a bottom board and a side board mounted to the bottom board, the optic film being fixed by the double-sided adhesive tape to the side board of the backplane and the light source circuit board.

In the above backlight module, the bottom board and the light guide plate comprise a reflector plate arranged therebetween.

In the above backlight module, the light guide plate has an end that comprises a receiving trough formed therein, the receiving trough having a sidewall forming the light incidence side, the light source being received in the receiving trough.

The present invention also provides a display device, which comprises a backlight module and a liquid crystal panel, the backlight module comprising a backplane, a light guide plate, a light source, and an optic film, the light guide plate, the light source, and the optic film being arranged on the backplane, the optic film being stacked on the light guide plate, the light guide plate comprising a light incidence side, the light source comprising a light emission surface and a lighting-opposite surface opposite to the light emission surface, the light emission surface of the light source being arranged to face the light incidence side of the light guide plate, the light emission surface comprising a plurality of light transmission structures projecting therefrom, the liquid crystal panel being disposed on the backlight module, the liquid crystal panel and the backlight module being fixed together by a double-sided adhesive tape.

In the above display device, the light transmission structures comprise prismatic or triangular lenses.

In the above display device, light guide plate has a surface that comprises a light homogenization structure, which makes light emitting from the light guide plate homogeneous, and another surface that is opposite to said surface and is coated with a reflective coating layer.

In the above display device, backlight module further comprises a mold frame, the mold frame surrounding the light guide plate and the optic film and being disposed on the backplane, the light source being located between the mold frame and the light incidence side.

In the above display device, light source further comprises the light source circuit board, the light source circuit board being fixed by a double-sided adhesive tape to an inside surface of the mold frame and the light guide plate.

In the above display device, backplane comprises a bottom board and a side board mounted to the bottom board, the optic film being fixed by the double-sided adhesive tape to the side board of the backplane and the light source circuit board.

In the above display device, bottom board and the light guide plate comprise a reflector plate arranged therebetween.

In the above display device, light guide plate has an end that comprises a receiving trough formed therein, the receiving trough having a sidewall forming the light incidence side, the light source being received in the receiving trough.

The present invention provides a display device that comprises a light source having a light emission surface that comprises a plurality of lens structures. Light emitting from the light source transmits through the light transmission structures to be subjected to multiple times of refraction to enter the light incidence side of the light guide plate so as to prevent the light from the light emission surface from getting divergent and giving off from an edge of the light incidence side thereby concentrating the light from the light source and increasing light incidence efficiency of the light entering the light incidence side and thus improving the displaying performance of the display device.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

FIG. 1 is a cross-sectional view showing a backlight module according to a preferred embodiment provided by the present invention.

DETAILED DESCRIPTION OF THE PREFERRED EMBODIMENTS

A clear and complete description will be given to a technical solution proposed in an embodiment of the present invention with reference to the attached drawings of the embodiment of the present invention.

Referring to FIG. 1, a preferred embodiment of the present invention provides a backlight module 10, which comprises a backplane 11, a light guide plate 13, a light source 15, and an optic film 17. The light guide plate 13, the light source 15, and the optic film 17 are arranged on the backplane 11 and the optic film 17 is stacked on the light guide plate 13. The light guide plate 13 comprises a light incidence side 131. The light source 15 comprises a light emission surface 151 and a lighting-opposite surface 152 opposite to the light emission surface 151. The light emission surface 151 of the light source 15 is arranged to face the light incidence side 131 of the light guide plate 13. The light emission surface 151 comprises a plurality of light transmission structures 16 projecting therefrom.

In the instant embodiment, the light transmission structures 16 are prismatic or triangular lenses. The prismatic or triangular lenses are uniformly arranged on the light emission surface 151. Light emitting from the light emission surface 151 of the light source 15 transmits through the light transmission structures 16 to be subjected to multiple times of refraction to enter the light incidence side 131 of the light guide plate 13 so as to prevent the light from the light emission surface 151 from getting divergent and giving off from an edge of the light incidence side thereby enhancing the utilization of the light.

In the instant embodiment, the light guide plate 13 has a surface that comprises a light homogenization structure, which makes light emitting from the light guide plate 13 homogeneous, and another surface that is opposite to said surface and is coated with a reflective coating layer. The surface that comprises the light homogenization structure is arranged to face the optic film 17.

In other embodiments of the present invention, the light guide plate 13 has an end that comprises a receiving trough (not shown) formed therein. The receiving trough has a sidewall forming the light incidence side 131. The light source 15 is received in the receiving trough to facilitate positioning of the light source and tight engagement between the light emission surface 151 and the light incidence side 131 so as to ensure, to the maximum extent, the tightness between the light source 15 and the light guide plate 13 to thereby enhance light incidence efficiency.

In the instant embodiment, the backlight module 10 further comprises a mold frame 12. The mold frame 12 surrounds the light guide plate 13 and the optic film 17 and is disposed on the backplane 11. The light source 15 is located between the mold frame 12 and the light incidence side 131.

The backplane 11 comprises a bottom board 111 and a side board 112 that is arranged to surround the bottom board 111. The bottom board 111 and the side board 112 delimit a receiving space for receiving the light guide plate 13, the light source 15, and the optic film 17. the light guide plate 13 and the bottom board 111 are arranged to stack on each other. In the instant embodiment, the bottom board 111 and the light guide plate 13 comprise a reflector plate 19 arranged therebetween.

In the instant embodiment, the light source 15 further comprises a light source circuit board 153. The light source circuit board 153 is fixed by a double-sided adhesive tape to an inside surface of the mold frame 12 and the light guide plate 13. Specifically, the inside surface of the mold frame 12 comprises a stage formed thereon and the light source circuit board 153 is fixed by the double-sided adhesive tape to the stage and an edge of the light guide plate 13 that is adjacent to the light incidence side 131.

In the instant embodiment, the optic film 17 may comprise various films stacked on each other, such as diffuser plates, prism plates, and polarizers. The optic film 17 is fixed by a double-sided adhesive tape 18 to the sidewall 112 and the mold frame 12. The optic film 17 is fixed by the double-sided adhesive tape 18 to the sidewall 112, the light source circuit board 153, and the mold frame 12.

The present invention also provides a display device. The display device comprises a backlight module 10 and a liquid crystal panel (not shown). The liquid crystal panel is arranged on the backlight module 10 and the liquid crystal panel and the backlight module 17 are fixed together by the double-sided adhesive tape 18.

The present invention provides a display device that comprises a backlight module that comprises a light source 15. The light source 15 has a light emission surface 151 comprising lens structures 16. Light emitting from the light source 15 transmits through the light transmission structures 16 to be subjected to multiple times of refraction to enter the light incidence side 131 of the light guide plate 13 so as to prevent the light from the light emission surface 151 from getting divergent and giving off from an edge of the light incidence side thereby concentrating the light from the light source and increasing light incidence efficiency of the light entering the light incidence side and thus improving the displaying performance of the display device.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A backlight module, comprising a backplane, a light guide plate, a light source, and an optic film, the light guide plate, the light source, and the optic film being arranged on the backplane, the optic film being stacked on the light guide plate, wherein the light guide plate comprises a light incidence side, the light source comprising a light emission surface and a lighting-opposite surface opposite to the light emission surface, the light emission surface of the light source being arranged to face the light incidence side of the light guide plate, the light emission surface comprising a plurality of light transmission structures projecting therefrom;

wherein the light emission surface of the light source comprises a substantially straight flat surface on which the light transmission structures are formed to face the light incidence surface of the light guide plate for projecting light in a non-divergent manner to the light incidence surface of the light guide plate; and wherein the light source comprises a light source circuit board, which has an inward-facing surface that carries the light source thereon and has an edge portion positioned on and supported by an end edge portion of the light guide plate that is adjacent to the light incidence side of the light guide plate, a piece of double-side adhesive tape being interposed between the edge portion of the inward-facing surface of the light source circuit board and the end edge portion of the light guide plate to fix the light source circuit board to the light guide plate, the light source circuit board having an outward-facing surface that is substantially flush with and located between a top surface of the optic film stacked on the light guide plate and a top surface of a side board of the backplane, a piece of adhesive tape being arranged to extend over and adhesively attach to the top surface of the optical film, the outward-facing surface of the light source circuit board, and the top surface of the side board of the backplane to further fix the light source circuit board in position between the sidewall of the backplane and the optic film.

2. The backlight module as claimed in claim 1, wherein the light transmission structures comprise prismatic or triangular lenses.

3. The backlight module as claimed in claim 1, wherein the light guide plate has a surface that comprises a light homogenization structure, which makes light emitting from the light guide plate homogeneous, and another surface that is opposite to said surface and is coated with a reflective coating layer.

4. The backlight module as claimed in claim 1, wherein the backlight module further comprises a mold frame, the mold frame surrounding the light guide plate and the optic film and being disposed on the backplane, the light source being located between the mold frame and the light incidence side.

5. The backlight module as claimed in claim 4, wherein, the inward-facing surface of the light source circuit board is further fixed by a double-sided adhesive tape to an inside surface of the mold frame.

6. The backlight module as claimed in claim 5, wherein the backplane comprises a bottom board to which the side board is mounted, the mold frame and the light guide plate being supported on the bottom board of the backplane.

7. The backlight module as claimed in claim 6, wherein a reflector plate is arranged between the bottom board of the backplane and the light guide plate.

8. The backlight module as claimed in claim 1, wherein the light guide plate has an end that comprises a receiving trough formed therein, the receiving trough having a sidewall forming the light incidence side, the light source being received in the receiving trough.

9. A display device, comprising a backlight module and a liquid crystal panel, the backlight module comprising a backplane, a light guide plate, a light source, and an optic film, the light guide plate, the light source, and the optic film being arranged on the backplane, the optic film being stacked on the light guide plate, wherein the light guide plate comprises a light incidence side, the light source comprising a light emission surface and a lighting-opposite surface opposite to the light emission surface, the light emission surface of the light source being arranged to face the light incidence side of the light guide plate, the light emission surface comprising a plurality of light transmission structures projecting therefrom, the liquid crystal panel being disposed on the backlight module, the liquid crystal panel and the backlight module being fixed together by a double-sided adhesive tape;

wherein the light emission surface of the light source comprises a substantially straight flat surface on which the light transmission structures are formed to face the light incidence surface of the light guide plate for projecting light in a non-divergent manner to the light incidence surface of the light guide plate; and wherein the light source comprises a light source circuit board, which has an inward-facing surface that carries the light source thereon and has an edge portion positioned on and supported by an end edge portion of the light guide plate that is adjacent to the light incidence side of the light guide plate, a piece of double-side adhesive tape being interposed between the edge portion of the inward-facing surface of the light source circuit board and the end edge portion of the light guide plate to fix the light source circuit board to the light guide plate, the light source circuit board having an outward-facing surface that is substantially flush with and located between a top surface of the optic film stacked on the light guide plate and a top surface of a side board of the backplane, a piece of adhesive tape being arranged to extend over and adhesively attach to the top surface of the optical film, the outward-facing surface of the light source circuit board, and the top surface of the side board of the backplane to further fix the light source circuit board in position between the sidewall of the backplane and the optic film.

10. The display device as claimed in claim 9, wherein the light transmission structures comprise prismatic or triangular lenses.

11. The display device as claimed in claim 9, wherein the light guide plate has a surface that comprises a light homogenization structure, which makes light emitting from the light guide plate homogeneous, and another surface that is opposite to said surface and is coated with a reflective coating layer.

12. The display device as claimed in claim 9, wherein the backlight module further comprises a mold frame, the mold frame surrounding the light guide plate and the optic film and being disposed on the backplane, the light source being located between the mold frame and the light incidence side.

13. The display device as claimed in claim 12, wherein the inward-facing surface of the light source circuit board is further fixed by a double-sided adhesive tape to an inside surface of the mold frame.

14. The display device as claimed in claim 13, wherein the backplane comprises a bottom board to which the side board is mounted the mold frame and the light guide plate being supported on the bottom board of the backplane.

15. The display device as claimed in claim 14, wherein a reflector plate is arranged between the bottom board of the backplane and the light guide plate.

16. The display device as claimed in claim 9, wherein the light guide plate has an end that comprises a receiving trough formed therein, the receiving trough having a sidewall forming the light incidence side, the light source being received in the receiving trough.

* * * * *